Feb. 15, 1966   G. B. RICHARDS   3,234,791
LIQUID SUPPLY AND METERING SYSTEMS
Filed May 28, 1962   6 Sheets-Sheet 1

INVENTOR.
George B. Richards
BY
Fidler, Beardsley & Brockley
Attys.

Feb. 15, 1966  G. B. RICHARDS  3,234,791
LIQUID SUPPLY AND METERING SYSTEMS
Filed May 28, 1962  6 Sheets-Sheet 4
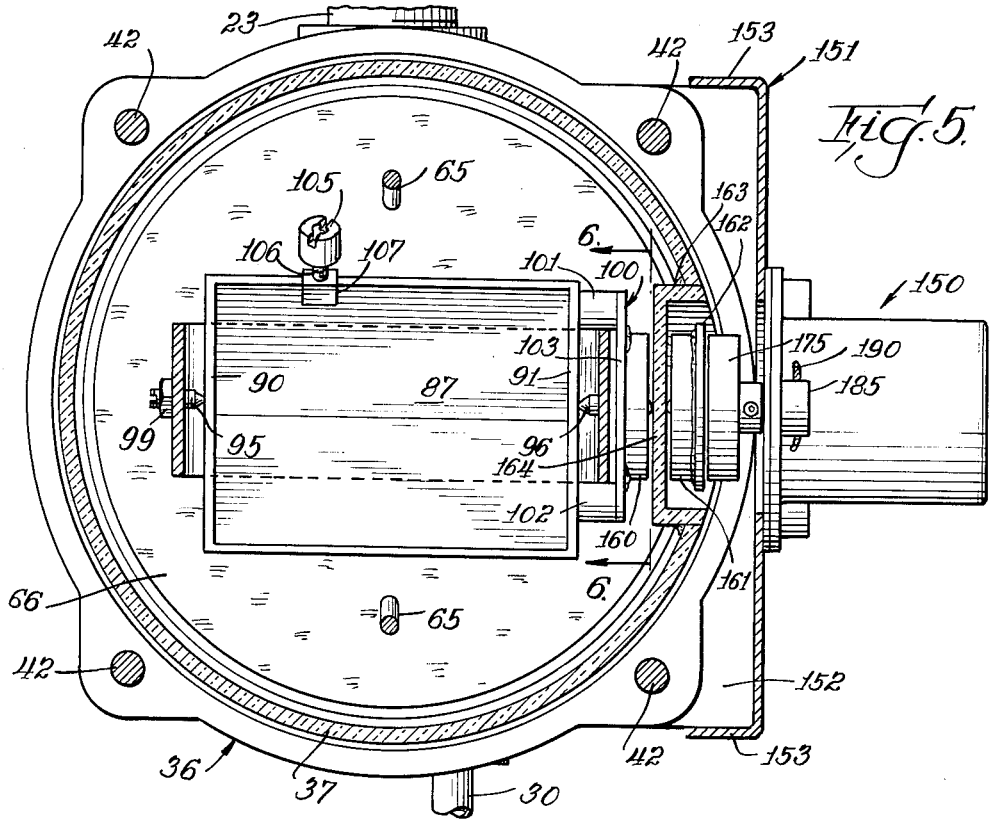
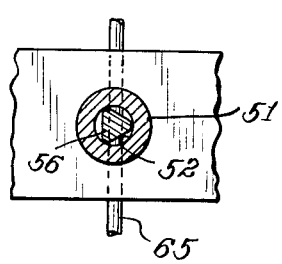
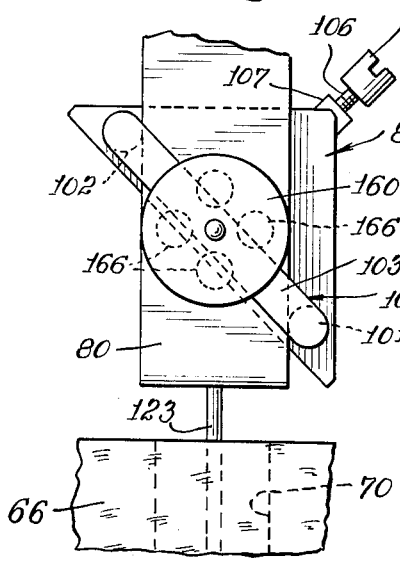
INVENTOR.
George B. Richards
BY
Fidler, Beardsley & Bradley
Attys Feb. 15, 1966 G. B. RICHARDS 3,234,791
LIQUID SUPPLY AND METERING SYSTEMS
Filed May 28, 1962 6 Sheets-Sheet 5
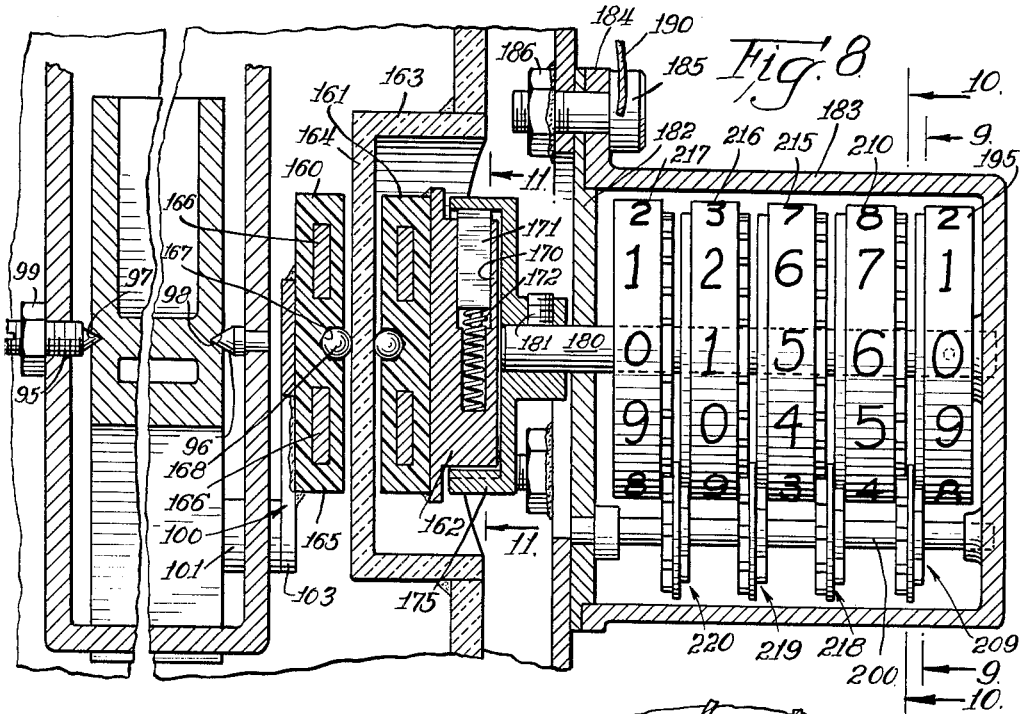
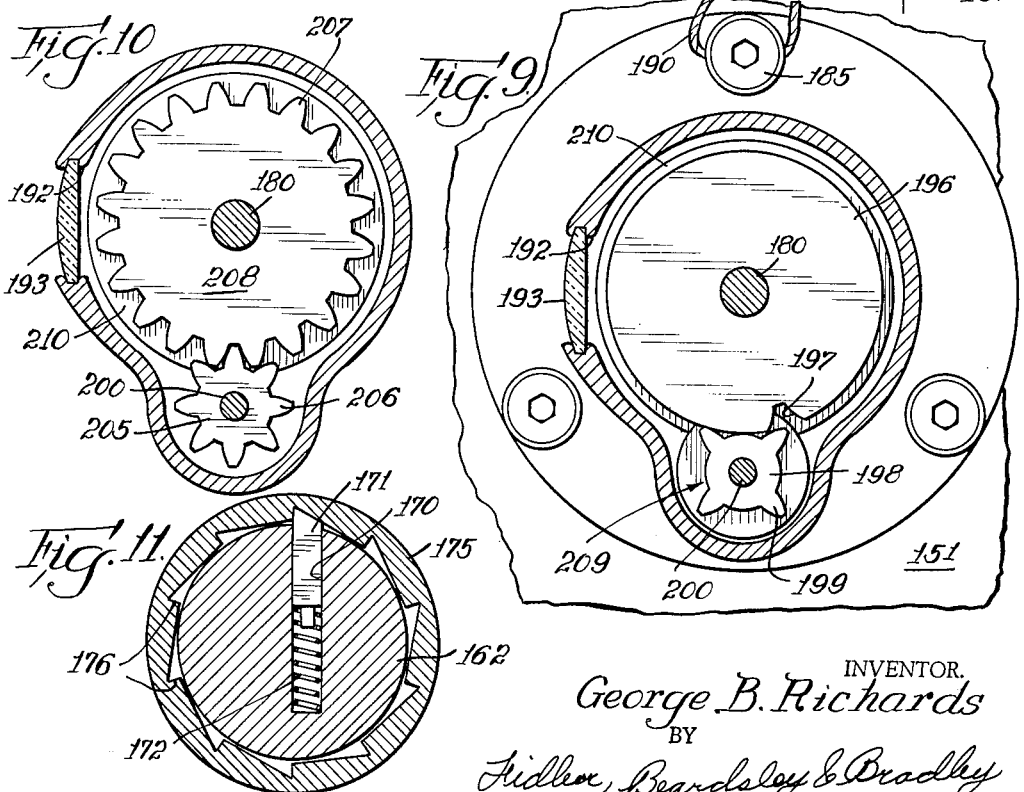
INVENTOR.
George B. Richards
BY
Fidler, Beardsley & Bradley
Attys.

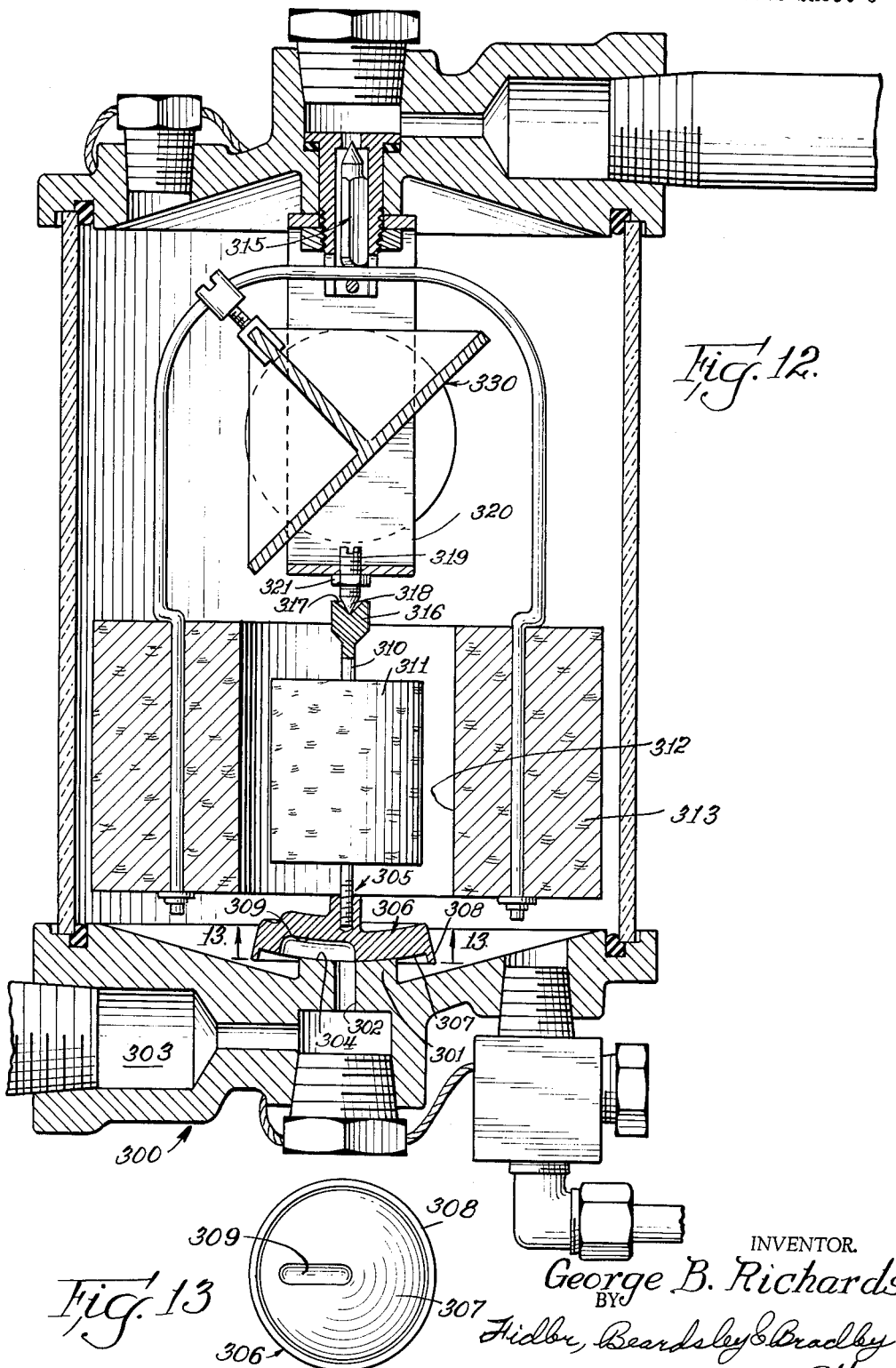

United States Patent Office

3,234,791
Patented Feb. 15, 1966

3,234,791
LIQUID SUPPLY AND METERING SYSTEMS
George B. Richards, Lake Forest, Ill., assignor to Liquid Controls Corporation, North Chicago, Ill., a corporation of Illinois
Filed May 28, 1962, Ser. No. 198,190
3 Claims. (Cl. 73—223)

This invention relates to liquid supply and metering systems and to a liquid meter especially suitable for use in such systems.

For the purpose of illustration the invention is shown and described in connection with its application as a system for supplying liquid fuel to a furnace burner. However, it will be understood that the invention may be employed in supplying liquid to other types of utilization devices. It will also be understood that while the meter is especially suited for use in the system shown and described it is not limited to such use but is suitable for use in any of a large number of different uses where liquid flow is to be measured.

Conventionally, liquid fuel for use in furnaces is stored in a tank connected to the furnace with one tank supplying a single furnace or a plurality of furnaces in a single building. The fuel is metered when it is placed in the tank and the user is charged for the fuel delivered to the tank. Recently, the practice has developed of providing a single, central supply tank connected to a plurality of furnaces in a single building or in a number of different buildings, with an individual meter being connected in the supply line to each furnace. Thus, the amount of fuel consumed by each furnace can be metered. Where the furnaces are owned by different parties, each party can be charged periodically for the amount of fuel consumed by his furnace as shown by the individual meter connected thereto.

The meter of the present invention is of the rockable receptacle type, commonly known as a "gravimeter" or "weighmeter." In a liquid meter of the gravimeter or weighmeter type, a meter casing is provided which defines a chamber having an inlet and outlet. A centrally partitioned, open top receptacle or bucket is provided and forms two approximately equal volume open top compartments. The bucket is mounted for rockable movement between two positions about a horizontal axis. In one of the positions a first compartment is positioned upright under the inlet to receive liquid flowing into the chamber through the inlet and to retain the liquid until the compartment is filled to a predetermined extent, whereupon the weight of the liquid in such first compartment causes the receptacle to rock about its axis to a second, alternate position wherein the first compartment is tilted downwardly into dumping position to permit the liquid to be discharged and empty the compartment. This movement brings the second compartment into upright collecting position under the inlet to receive liquid from the inlet whereupon the filling and dumping operation is repeated. So long as fluid flows into the chamber through the inlet the receptacle is caused to rock between its two positions and the compartments are alternately filled and dumped. The compartments usually are equal in capacity, so that upon each filling and dumping action an equal quantity of liquid is collected and dumped. The liquid is discharged from the chamber through the outlet.

A counter is connected to the rockable receptacle whereby upon each rocking movement of the receptacle from one position to the other, the counter is actuated. Thus, the number of oscillations of the meter are counted. Therefore the count represents the weight of liquid passing into the meter chamber. Customarily the counter is provided with a visible register which registers the number of oscillations of the meter and thus the weight of liquid which has passed into the chamber.

In a meter of the rockable type the inflow of liquid relatively to the outflow may be such that the inflow exceeds the outflow to a sufficient extent and for a sufficient period that the quantity of liquid which may be collected in the chamber below the receptacle and the level of the liquid may rise to the level of the receptacle and interfere with the operation of the meter and the level may rise to a sufficient height that the meter will be halted. Thus, any undue rise of liquid in the chamber may result in rendering the operation of the meter inaccurate.

It is an object of the present invention to provide a liquid meter wherein the flow of liquid into the chamber is controlled automatically by the level of the liquid in the chamber to prevent the collection in the meter of a sufficient quantity of liquid to adversely affect the accuracy of the meter.

In a meter of the rockable receptacle type it is also essential that the receptacle be so formed and so supported that an equal quantity of liquid will be collected and dumped upon each cycle of operation, that is, upon the filling and dumping of first one compartment followed by the filling and dumping of the other compartment. It has been found that if the meter is supported so that it is not plumb and the pivot axis of the receptacle is not horizontal, the meter may not correctly register the weight of liquid entering the chamber. In fact, if the meter is tilted sufficiently or placed on its side, or inverted, the receptacle will not be positioned to collect the liquid and the liquid will flow into the chamber without entering the receptacle. Thus, it is possible that by accident, or the design of unscrupulous persons, the meter may be so installed that it is not plumb or may be moved out of its plumb position and thereby rendered inaccurate or even wholly inoperative.

It is an object of the present invention to provide a liquid meter wherein, if the meter is not installed and maintained in an upright, plumb position, with the receptacle axis horizontal, the flow of liquid into the meter is cut off and cannot be established unless and until the meter is placed in an upright, plumb position.

In certain liquid supply systems employing a utilization device, as for example a fuel burner, the system employs a pump for pumping the liquid fuel from a source of supply such as a tank, to the burner. In order to insure that the burner receives an adequate quantity of fuel, a pump is often provided which has a capacity greater than that of the burner. Thus, it is necessary to cause a portion of the fuel to by-pass the burner. Such by-passed fuel is customarily returned to the fuel supply tank. Such returned fuel is again pumped from the tank to the burner in consequence of which it is caused to flow through the meter, where a meter is provided, and thus is metered a second time. Accordingly, such meter will meter a larger quantity of fuel than that actually consumed by the burner.

It is an object of the present invention to provide a liquid supply and metering system wherein liquid which has once passed through a meter and has thereby been metered and which is then caused to by-pass a utilization device can again be supplied to the utilization device without being metered a second time.

In certain liquid supply systems employing a pump for effecting the flow of liquid it is often necessary to prime the pump by removing air therefrom so that the liquid will flow in the system when the pump is operated. One example of such system is a furnace fuel supply system wherein a fuel pump is connected to a tank and to a utilization device such as a burner, for pumping liquid fuel from the tank to the burner. In such a system, when the tank is exhausted to the extent that the liquid level in the tank falls below the level of the tank discharge pipe, air is drawn into the system. In systems heretofore known the pump is primed, after the liquid in the tank is replaced, by opening a vent from the pump located in parallel with the burner and the pump operated to exhaust the air from the system and cause liquid fuel to flow from the tank to the burner.

Where a liquid meter of the conventional positive-displacement type is installed in the line connecting the tank with the burner for measuring the amount of fuel supplied, the passage of air through the meter during the priming operation will cause the meter to rotate and thus meter and register an amount on the register connected to the meter which does not represent any flow of liquid through the meter.

It is an object of the present invention to provide a liquid supply and metering system which will measure and register only liquid passing through the meter.

Another object of the invention is to provide a new and improved liquid meter.

Another object is to provide a new and improved liquid meter of the rockable receptacle type.

Another object is to provide a liquid meter wherein the flow of liquid into the meter is automatically halted whenever the inflow is sufficient relatively to the outflow to affect the accuracy of the meter.

Another object is to provide a liquid meter wherein the flow of liquid through the meter is automatically cut off whenever the meter is placed in such position as to adversely affect its accuracy.

Another object is to provide a liquid meter of simple construction which measures the liquid passing therethrough with a high degree of accuracy.

Still another object is to provide a liquid meter having cut-off means which automatically halts the flow of liquid through the meter whenever the meter is placed in such position as to adversely affect the accuracy of the meter and wherein the cut-off means is ineffective when the meter is in normal operating position.

A further object is to provide a liquid meter wherein the flow of liquid into the meter is automatically halted whenever the flow of liquid into the meter or the position of the meter is such as to adversely affect the accuracy of the meter.

Another object is to provide a liquid supply and metering system having a meter and wherein the liquid which has passed through the meter can be recirculated through the meter casing without actuating the meter.

Another object is to provide a liquid supply and metering system having a pump and a meter connected thereto wherein the meter is not actuated by the passage of air therethrough during the priming of the system.

Other objects of the invention will appear from the following description taken in connection with the appended drawings, wherein:

FIG. 5 is a view of a section taken along line 5—5 of FIG. 3;

FIG. 6 is a view of a section taken along line 6—6 of FIG. 3;

FIG. 7 is a view of a section taken along line 7—7 of FIG. 4;

FIG. 8 is an enlarged, fragmentary, vertical sectional view showing particularly the counter and drive therefor;

FIG. 9 is a view of a section taken along line 9—9 of FIG. 8;

FIG. 10 is a view of a section taken along line 10—10 of FIG. 8;

FIG. 11 is a view of a section taken along line 11—11 of FIG. 8; and

FIG. 12 is an elevational view, broken away and partially sectioned, of a second embodiment of the invention; and FIG. 13 is a bottom view of the outlet valve member shown in FIG. 13.

Figure 1:
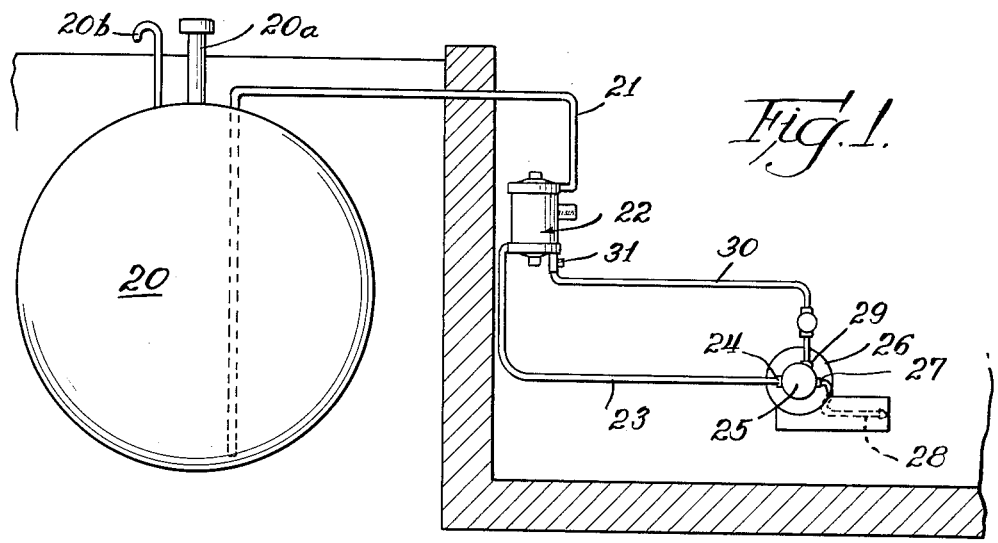
FIGURE 1 is a somewhat diagrammatic view of one form of liquid supply and metering system in accordance with the invention.
Figure 2:
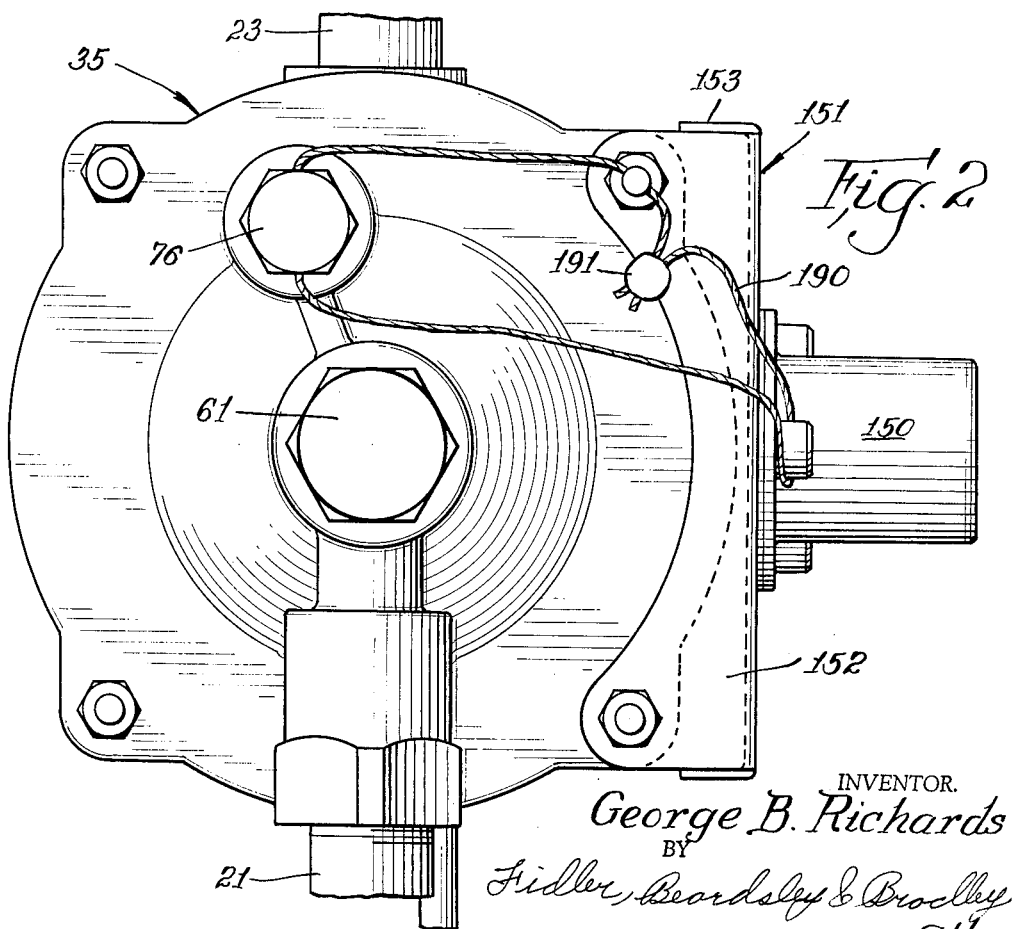
FIG. 2 is a top plan view of a meter in accordance with the invention.

Referring now to FIG. 1 there is shown diagrammatically one form of a liquid supply and metering system in accordance with the invention and embodying a meter constructed in accordance with the invention. By way of example the system is one for supplying liquid fuel to a furnace burner.

The system includes a source of fuel such as a tank 20 having a filling pipe 20a and a vent 20b, a supply or meter inlet conduit 21 leading from the tank and a meter 22 having a primary inlet connected to the supply conduit. A meter outlet conduit 23 leads from the meter 22 and is connected to the inlet 24 of a pump 25 of known construction driven as by an electric motor 26. The pump 25 has a primary outlet 27 connected to a burner 28 of known construction and a secondary outlet 29 connected as by a return conduit 30 to a secondary inlet 31 of the meter 22.

Figure 3:
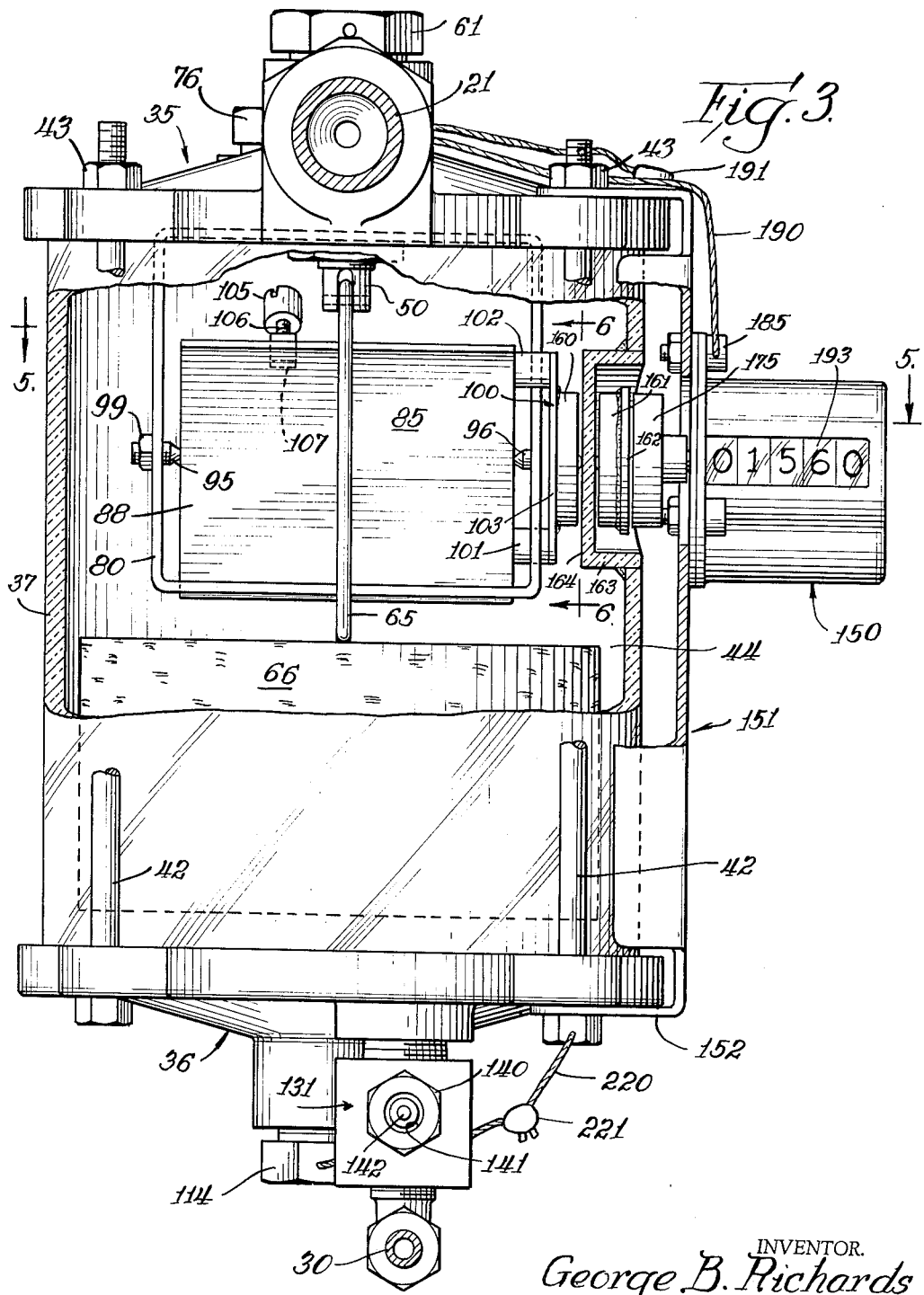
FIG. 3 is a front elevational view with parts broken away and in section of the meter of FIG. 2.
Figure 4:
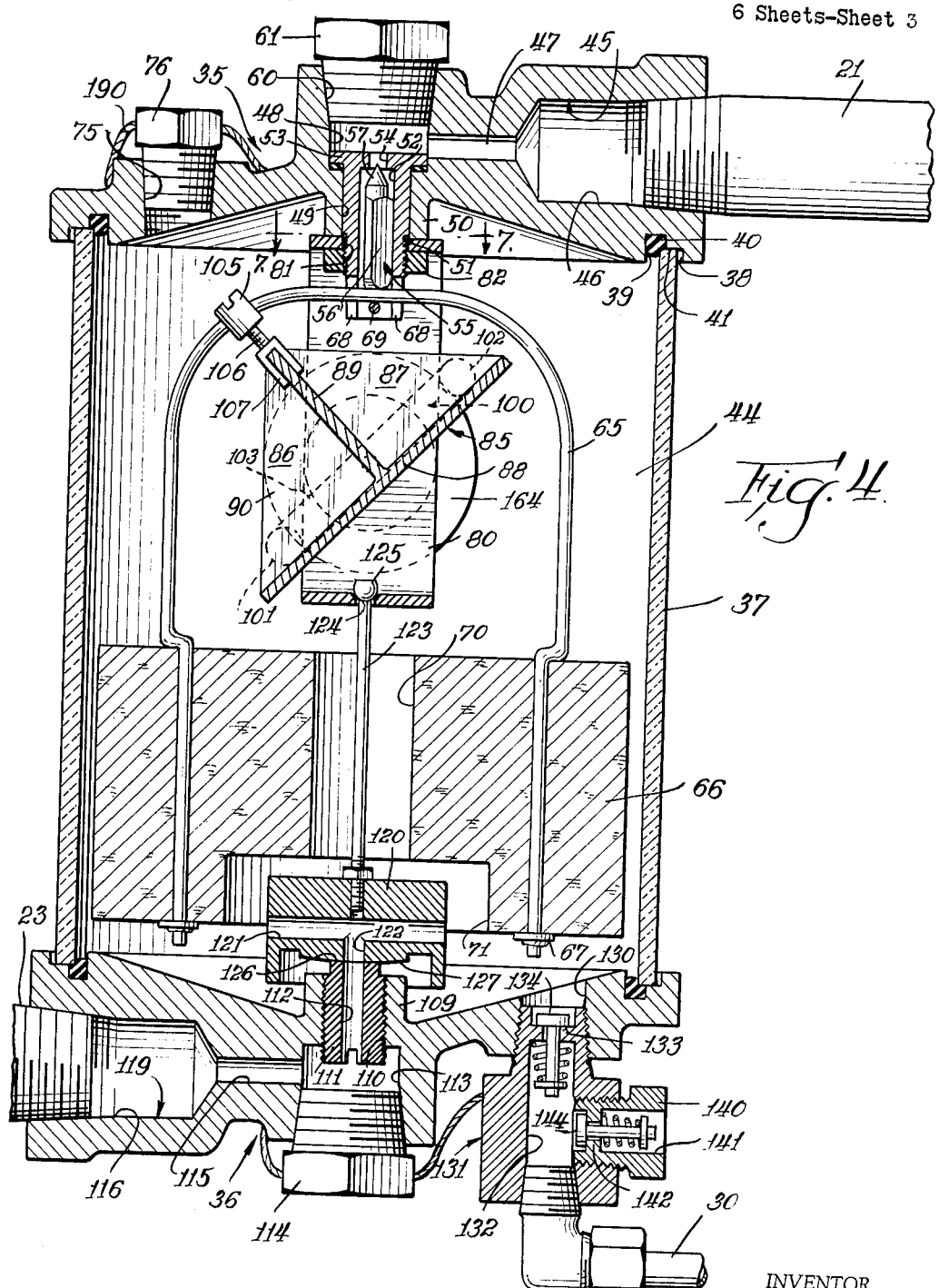
FIG. 4 is a vertical sectional view of the meter of FIG. 2.

Referring now particularly to FIGS. 2 to 11 of the drawings and especially FIGS. 3 to 5, the meter includes a casing having a cap or top wall 35, a base or bottom wall 36 and a body or side wall 37. The body 37 preferably is of generally cylindrical form and is seated at its ends in the cap and base respectively, each of the latter having a stepped angular groove 38 formed with a deeper inward portion 39 in which is inserted a sealing O ring 40 formed of a suitable resilient material, such as a synthetic plastic. The groove provides a step 41 against which the end of the body 37 seats so that while the sealing ring 40 is compressed between the body 37 and cap 35, the body is rigidly held between the base and cap.

The body 37 is formed of any suitable rigid material but preferably is formed of a transparent material such as glass or synthetic plastic in order that the interior of the casing may be visible from the outside.

The cap 35, base 36 and body 37 are secured together in assembled relation by stay bolts 42 (see FIG. 3) extending through the base and cap and nuts 43 threaded onto the bolts 42. The cap, base and body are thus held in tight sealing relation and together define a chamber 44. Thus, when the meter is in normal use the chamber 44 is enclosed (except for the inlet and outlet) and a vacuum can be drawn thereon to cause liquid to be drawn into the chamber from the tank 20 as hereinafter explained.

The cap 35 is formed with an inlet passage 45 leading into the chamber 44 and having an enlarged portion 46 preferably threaded for connection of an inlet pipe such as the conduit 21 which leads from a source of liquid such as the tank 20. The inlet 45 also has a reduced portion 47 and an enlarged vertical portion 48. A vertical bore 49 extends from the portion 48 through a boss 50 and opens into the chamber 44.

Disposed in the bore 49 is an inlet valve housing 51 having a bore 52 and a flanged end wall 53 having a valve opening 54 therein. Thus, the complete inlet passage 45 includes the portion 46, the reduced portion 47, the vertical portion 48, the valve opening 54 and the bore 52 of the valve housing 51.

A valve member 55 having a body portion 56 of generally triangular cross section and a tapered end 57 is slidable in the bore 52. The valve member 55 normally is urged downwardly to open position by gravity and differential fluid pressure thereacross but is movable upwardly, by means hereinafter described, to close the opening 54 and thus control the inflow of liquid into the chamber 44.

The bore 48 has a tapered portion 60 which together with the bore 48 provides an opening for the insertion of the valve housing 51 into the bore 49. The bore portions 48 and 60 also may serve as an alternate inlet where such is desired instead of the horizontal inlet 46. When not so used the bore 48 is closed by a plug 61.

The valve member 55 normally is moved downwardly by gravity or differential fluid pressure to open position and in its lower position seats against a bail 65 which carries a float 66 disposed in the lower portion of the chamber 44 and adapted to be buoyantly supported by any liquid which may collect in the lower portion of the chamber 44 when the liquid rises to a predetermined level. The float 66 is suitably retained on the bail 65 as by C-rings 67. The bail 65 passes through slots 68 in the lower end of the valve housing 51 and is retained against removal by a cross pin 69 secured in the lower end of the housing 51. The bail 65 is permitted to move up and down in the slots 68, it being limited in its downward movement by the pin 69 and in its upward movement by the valve member 55 when the latter seats in the valve opening 54. Thus, it will be seen that the valve is normally in open position, but is closed when there is a predetermined quantity of liquid collected in the bottom of the chamber 44.

The float 66 may be made of any suitable material and construction whereby the float is inert to the liquid to which it is used and is of such density that it is buoyantly supported in the liquid. Preferably, the float is formed from a styrene foam plastic but may be formed of other foam plastic or merely a lightweight plastic or may be formed as a closed hollow metal body (not shown). The float 66 is formed with a central opening 70 having an enlarged portion 71 at its lower end in order to provide clearance for other parts of the meter hereinafter described.

An access opening 75 normally closed by a screw plug 76 is provided in the cover. This opening is provided for introducing a liquid into the casing for priming the pump as hereinafter explained. It also permits the insertion of a screw driver for adjusting the position of the counterweight hereinafter described.

A rectangular bracket 80 of strip form is disposed in the chamber 44 and has an opening 81 which is received over the valve housing 51, the bracket 80 being retained in position by a nut 82 threaded on the lower end of the valve housing 51, and being seated against the lower end of the boss 50 which projects downwardly from the cap. The nut 82 also serves to hold the valve housing 51 in place in the cap 35.

A receptacle or bucket 85 is rockably supported in the bracket 80 for movement between either of two positions. The receptacle is formed to provide two compartments 86, 87 and may be conveniently formed with a floor 88, an upstanding partition 89 and end walls 90 and 91. The receptacle 85 is symmetrical about a plane passing medially of the partition 89 and the two compartments 86 and 87 are of equal volumetric capacity.

The receptacle is pivotally supported for rocking movement about a horizontal axis by a pair of "needle" bearings 95, 96 (see FIG. 8) supported in opposite vertical portions of the bracket 80 and entering sockets 97, 98 in the end walls of the receptacle. The bearing 96 is preferably formed as a pin having a pointed head. The bearing 97 preferably is formed as a pointed screw adjustably extending through the bracket and secured in adjusted position by a lock nut 99. Thus, the receptacle can rock between either of two positions, the receptacle being shown in one of such positions in the drawings.

The rocking movement of the receptacle 85 in either direction of rotation about its pivot axis is halted by a bridge 100 having arms 101 and 102 and a connecting portion 103. The arms 101 and 102 are secured to the end wall 91 of the receptacle 85 and the bridge straddles the adjacent portion of the bracket 80 with the cross portion 103 being spaced outwardly from the bracket. The arms 101 and 102 are positioned to strike against the opposite edges of the bracket 80 and thus halt the movement of the receptacle in either direction and thereby establish two positions of rest of the receptacle. The receptacle is permitted to rock through an angle of 90° between its two positions of rest.

The movement of the receptacle is such that when the receptacle 85 is halted in one position (as seen in FIGS. 3 to 5 of the drawings) the compartment 87 is upright with its open end facing upwardly and is disposed in a "filling" position to receive and collect liquid flowing downwardly through the inlet opening 45. When the receptacle is in the position shown, the compartment 86 is positioned with its open end to one side and its floor inclined downwardly so that the compartment 86 is in a "dumping" position in which position the contents of the compartment 86 will flow freely from the receptacle. It will also be seen that when the receptacle is in its other position (that is, rotated counterclockwise through an angle of 90° from the position shown in FIG. 4) the compartment 86 will be in filling position and the compartment 87 will be in dumping position.

It should be noted that the pivot axis of the receptacle is located at all times at a level above the apex of both compartments formed by the juncture of the partition 89 and the floor 88. Thus, when the receptacle is positioned with the compartment 87 in filling position, the center of volume of the compartment 87 and consequently the center of gravity of any liquid in such compartment is slightly to the right (as viewed in FIG. 4) of the pivot axis. Thus, when the compartment 87 is in filling position and there is any liquid in the compartment such liquid creates a force establishing a force moment tending to rock the receptacle in a clockwise direction about the pivot axis. The weight of the receptacle on the left-hand side of the pivot axis is such as to create a force moment which prevents the receptacle from being rocked about its pivot in a clockwise direction until a predetermined weight of liquid is collected in the compartment 87. When the weight of the liquid collected in the compartment 87 plus the weight of the receptacle on the right-hand side of the pivot axis exceeds the weight of the receptacle on the left-hand side of the pivot axis, the receptacle is rocked in a clockwise direction to move the compartment 87 to dumping position and thereby dump the liquid therefrom and at the same time to move the compartment 86 into filling position under the inlet 45.

The receptacle is symmetrical with respect to the pivot axis and thus will be rocked in an apropriate direction when a predetermined quantity of liquid is collected in that one of the compartments which is disposed in liquid receiving and collecting or filling position. Thus, under normal conditions of operation the receptacle will collect an equal weight of liquid in each compartment before the receptacle is rocked to dump that compartment. Accordingly, for each cycle of operation, namely each two successive filling and dumping operations, an equal weight of liquid is collected and dumped by the receptacle. At this point, it should be understood that the meter acts to measure the liquid flowing into the chamber during each half cycle of operation in accordance with the weight of liquid. Therefore, the device measures the weight of the liquid flowing through the meter rather than the volume. However, under ordinary conditions of operation, the meter will be employed to meter the same liquid constantly and consequently can be calibrated to measure the quantity of liquid passing through the meter.

The capacity of each compartment of the receptacle is equal so that upon each half of a complete cycle an equal quantity of liquid is collected and dumped. Thus, for each half cycle the counter hereinafter described is actuated one step to cause the register to register an equal amount. Should foreign material such as dirt or gummy residue adhere to the receptacle on one side of the pivot axis, this will of course cause the receptacle to tilt out of collecting position and dump the collected liquid before the full weight of liquid has been collected in the corresponding compartment. However, owing to the weight which the foreign material adds to the corresponding side of the receptacle, it will require the collection of a correspondingly larger weight of liquid in the other compartment to tilt the receptacle to dump that compartment. Thus, the receptacle will be operative to perform a complete cycle by the collection of the same weight of liquid just as though the adherent foreign material were not present. It should be noted that the device is ordinarily so designed that the receptacle will tilt to dump either compartment prior to such compartment being completely filled with liquid.

The extent to which either compartment must be filled in order to cause the receptacle to rock and dump the compartment may be adjusted and thus the amount of liquid which will cause the meter to execute a filling and dumping cycle may be adjusted. To this end a counterweight 105 is provided which is threaded into a screw stem 106 secured on a mount 107 carried on the upper edge of the partition 89. Upon adjusting movement of the counterweight in a direction outwardly away from the edge of the partition, the effective moment of the receptacle in resisting the dumping movement is increased. Accordingly, a greater quantity of liquid must be collected by the compartment which is in filling position before the receptacle will rock to dump that compartment. Conversely, if the counterweight is adjusted to a position closer to the partition 89, a lesser volume of liquid will be required to rock the receptacle. The counterweight may be adjusted by inserting a screwdriver through the access opening 75.

The base 36 (see FIG. 4) is preferably formed from a casting which is identical with the casting forming the cap 35 but the base is disposed in inverted position relative to the cap. The base is formed with a bore 110 extending through a boss 109 in which bore is threaded an outlet valve seat 111 having a bore 112 providing a passage which leads into a vertical bore 113 normally closed by a screw plug 114. The bore 113 communicates with a reduced horizontal bore 115 opening into an enlarged bore 116 which preferably is threaded to receive the meter outlet discharge conduit 23. The discharge conduit may be connected to the bore 113 in which case the bore 116 is closed by the screw plug 114. Thus it will be seen that an outlet passage 119 is provided from the chamber 44 through the passage 112, the bore 113, the bore 115, and the bore 116.

An outlet valve 120 of circular form is disposed in position to control the flow through the valve passage 112. To this end the valve 120 is provided with a horizontal bore 121 from which leads an intersecting bore 122 which, when the valve 120 is in normal, plumb position, registers with the bore 112. Thus, a passage is provided leading from the chamber 44 to the bore 112 of the valve seat 111.

The valve 120 is swingably supported in position over the valve seat 111 by a rod 123 secured as by threads to the valve member 120. The rod 123 extends freely through an opening 124 in the bottom of the bracket 80 and is formed with a head 125 having a lower spherical surface whereby the rod 123 and the attached valve 120 are suspended from the bracket 80 for free swinging movement.

The upper end surface 126 of the valve seat member 111 is of spherical form having a radius about the pivot axis of the rod 123 and valve member 120 and the lower surface 127 of the valve member 120 is formed with a convex surface of similar radius. Thus, the valve member 120 seats against and in liquid sealing relation with the surface 126. At the same time, however, the valve member 120 is permitted to swing freely between a position wherein the bore 122 is in registry with the bore 112 and a position wherein the valve member 120 closes the bore 112. The arrangement is such that when the meter is in plumb position with the pivot axis of the receptacle 85 horizontal, the valve member 120 is in full open position and liquid can flow from the chamber through the bore 121 and the bore 122 to the bore 112. However, if the meter is displaced out of its plumb position more than a predetermined angle and therefore is moved relatively to the valve member 120, the valve member will close the bore 112 and thus prevent the flow of liquid through the outlet 119. Preferably the arrangement is such that if the meter is moved out of plumb position more than approximately 2°, the valve 120 is closed.

The stem 123 passes downwardly through the opening 70 in the float with adequate clearance and the valve member 120 is disposed in the enlarged opening 71 in the float 66 so that the float does not interfere with the swinging movement of the valve member 120. Also, this clearance permits the float 66 to move up and down without any interference on the part of the stem 123 and valve member 120.

The secondary inlet 31 to the meter is provided by a bore 130 in which is threaded a valve housing 131 having a vertical bore 132 in which is threaded the end of the return or by-pass conduit 30. The valve housing 131 is formed with a first valve seat 133 with which an inwardly opening, spring-pressed check valve 134 cooperates. Thus, liquid is permitted to flow from the return or by-pass conduit 30 through the valve housing 131 and back into the chamber 44 but cannot flow in a reverse direction.

The valve housing 131 is also provided with a vent which is defined by a casing 140 threaded into the side of the valve housing 131 and having a passage 141 opening into the passage 132 in the valve housing 131. The casing 140 is provided with a valve seat 142, and a spring loaded check valve 144 is provided which is normally urged into closed position to close the vent. However, the check valve 144 may be readily opened manually by the use of a screw driver or other suitable tool. In fact, the valve 144 may, if desired, be so positioned that it can be operated by pressing it inwardly with the finger of the hand.

The by-pass connection 30 is employed where it is desired to circulate liquid from the chamber 44 through the external circuit and utilization device and back into the chamber without metering such liquid. A by-pass is commonly employed in fuel burner systems where the capacity of the fuel pump is greater than the capacity of the burner and the fuel is returned to the supply container or is otherwise by-passed around the burner. Where the meter of the present invention is used, the fuel that is not consumed by the burner is returned through the by-pass connection to the chamber 44. The secondary inlet 31 is located preferably at the bottom of the meter casing but in any event is so located that liquid can be caused to flow into the casing through such inlet without entering the receptacle.

Means are provided for counting and recording the number of cycles of operation of the meter thereby recording the weight of liquid which has passed through the meter. To this end a counter 150 (see FIGS. 2 and 3) is provided and is secured to the casing by a mounting plate 151 having flanges 152 extending over and engaging the cap 35 and the base 36, and secured thereto by the stay bolts 42. The mounting plate 151 preferably is provided with a pair of vertical stiffening flanges 153 which also serve to prevent access to the space between the mounting plate 151 and the casing body.

The counter 150 (see FIGS. 8–11) may be of any suitable type which counts and registers cycles of oscillatory motion and may be generally similar to the counter made and sold by Veeder-Root, Inc. of Hartford, Connecticut under the description "Form No. A–114,515 Cyl–N" and described more in detail hereinafter. The counter preferably is driven by a magnetic drive which includes a first magnetic element 160 secured as by an adhesive to the bridge 100 and a second magnetic element 161 secured as by an adhesive to a driving disk 162. The body 37 is recessed as at 163 to provide a flat wall portion 164 on either side of which the magnet elements 160 and 161 are located. The magnet elements 160 and 161 are preferably identical and therefore only one such element will be described in detail.

The magnet element 160 includes a disk-shaped body 165 of suitable non-magnetic material as for example, a synthetic plastic, having embedded therein a plurality (for example, four) of permanent magnets 166 of disk form and disposed in spaced, circumferential arrangement (see FIG. 6). The two magnet elements 160 and 161 have their magnets so arranged that poles of opposite polarity are in opposition and each magnet exerts a magnetic attraction on the opposing magnet of the other magnetic element tending to pull the magnetic elements toward one other and to cause the magnetic elements 160 and 161 to rock simultaneously as the receptacle is rocked.

The body 165 (see FIG. 8) is formed with a central recess 167 in which is located a ball bearing 168 adapted to bear against the face of the wall portion 164.

The driving disk 162 has a recess 170 extending in a generally radial direction in which is slidably carried a pawl 171 resiliently urged outwardly by a spring 172. A portion of the disk 162 together with the pawl 171 is received in a ratchet cup 175 having a plurality of notches providing ratchet teeth 176 with which the pawl is adapted to cooperate to move the cup angularly about its axis as the driving disk 162 is rocked counterclockwise, as seen in FIG. 11. There are ten teeth in the cup and hence upon each rocking movement of the driving disk 162 through 90° the pawl will be caused to move from a position engaging a tooth to a position engaging the second tooth from the first tooth and cause forward rotational movement of the cup 175 through 72° or ⅕ of a revolution as hereinafter explained.

The cup 175 is secured to a counter wheel shaft or drive shaft 180 as by a set screw 181 to drive the shaft. The shaft 180 extends through an end wall 182 which, together with a cupped casing member 183, forms a casing for the counter. The shaft 180 is journalled in the end wall 182 and the opposite end wall of the casing member 183. The casing member 183 is provided with flanges 184 and is secured to the mounting plate 151 by bolts 185 passing through flanges 184 on the casing member 183 which bolts are retained by nuts 186 inside the mounting plate 151. The counter casing member 183 is retained against removal by a sealing wire 190 which passes through bores in the nut 185, in one of the stay bolt nuts 43, and in the screw plug 76 and secured by a seal 191.

The casing member 183 is provided with a sight opening 192 (see FIGS. 3 and 9) covered by a cover glass 193 for viewing the number wheels hereinafter described.

The counter wheel shaft 180 carries rigidly thereon a first number wheel 195 which serves as a "units" wheel. The number wheel 195 is provided with a series of digit symbols from "zero" to "nine" which are in equally spaced relation around the surface of periphery. Carried rigidly on one side of the number wheel 195 is a driving disk 196 having a single notch 197 therein adapted to cooperate with a pinion 198, having four equally spaced gear teeth 199 and mounted for free rotation on a pinion shaft 200 secured in the casing 183 and end plate 182. The pinion 198 carries on its face away from the units wheel 195, a pinion 205 having eight gear teeth 206 adapted to mesh with the gear teeth 207 of a driven gear 208 secured to the face of a second number wheel 210 disposed beside the first number wheel 195. The two pinions 198 and 205 are rigidly connected for simultaneous rotation and form a compound pinion 209.

The second number wheel 210 is mounted on the shaft 180 for free rotation relatively thereto and serves as a "tens" wheel. There are twenty teeth 207 on the gear 208. Thus, upon each complete revolution of the units wheel the notch 197 in the driving disk engages a tooth 199 of the pinion 198 and drives the compound pinion 209 through an angle of 90°. The compound pinion 209 accordingly drives the gear 208 and consequently the tens wheel 210 through 36° or ¹⁄₁₀ of a revolution. Each driving disk, the cooperating compound pinion and the driven 20-tooth gear thus constitutes a tens transfer mechanism which moves a higher order number wheel through one step each time the next lower order wheel is rotated from its nine position to its zero position.

The next three wheels 215, 216, and 217 are similar to the tens wheel 210 except that the leftmost (as viewed in FIG. 8) wheel 217 does not have any driving disk such as the disk 196. The wheels 215, 216 and 217 are mounted on the shaft 180 for free rotation thereon and serve as hundreds, thousands and ten thousands wheels, respectively. It will be understood that where a meter having a capacity for metering and registering a larger quantity of liquid is desired, additional and higher order number wheels may be provided. Compound driving pinions 218, 219, and 220 are carried on the shaft 200 for communicating the movement of each lower order wheel to the next higher order wheel in a manner similar to that in which the movement of the units wheel is communicated to the tens wheel just described.

The meter 22 is installed by connecting the primary inlet 45 to the tank 20 by the supply pipe 21. The outlet pipe 23 is connected to the outlet 119 and to the inlet 24 of the pump 25. The return or by-pass pipe 30 is connected to the secondary outlet of the pump 25 and to the secondary inlet 31 of the meter. The primary outlet 27 of the pump 25 is connected to the burner 28 in the usual manner.

Before operating the system it is necessary that the meter be adjusted so that it is in plumb position whereby the outlet valve member 120 is in position so that the outlet is open and a flow of liquid from the interior of the meter can be effected through the outlet.

If the pump has been primed, this system can be operated by energizing the electric motor. Assuming, however, that the tank has been filled for the first time or has been refilled after having been empty, it is necessary to prime the pump. The pump is started and the vent valve 144 is opened. The operation of the pump will draw air out of the meter chamber 44 through the outlet line 23 and also from the inlet line 21 and tank into the meter chamber 44. The air is exhausted from the pump partially through the burner 28 and the remainder through the conduit 23 and vent 141. The check valve 134 has a sufficiently strong spring so as to prevent it from being opened during the priming operation. Just as soon as sufficient vacuum has been established in the system from the tank to the pump, liquid will be drawn from the tank through the meter and supplied to the burner. The excess liquid not required by the burner will be returned to the meter through the by-pass line 30. When liquid appears at the vent, the check valve 142 is allowed to close and liquid will then be forced through the check valve 134 and returned to the chamber 44. However, since the liquid is returned to the chamber 44 through the secondary inlet, it does not enter the receptacle and is not metered.

In some instances it may be found desirable to provide an additional priming effect on the pump by removing the screw plug 76 and introducing liquid into the chamber 44 through the access opening 75 whereafter the screw plug 76 is then replaced.

All liquid drawn into the meter through the supply line 21, both during priming and during operation, enters the inlet 45 and falls into that one of the compartments of the receptacle 85 which is in receiving and filling position at that time. When the desired quantity of liquid is collected in the compartment, the weight of the liquid thus collected is sufficient to cause the receptacle 85 to rock to its other position and dump the contents of the compartment which has just been filled. At the same time, the other compartment is moved into position to receive and collect liquid from the inlet.

Upon each cycle of operation of the receptacle, namely, the filling and dumping of first one compartment and then the other, the magnet element 160 is caused to execute a rocking movement which causes a similar rocking movement of the magnet element 161 resulting in a similar rocking movement of the driving disk 162. The first portion of the rocking movement—that is, one-half of the cycle of movement of the receptacle—moves the pawl 171 from its position engaging a tooth 176 of the driven cup 175 through an angle of 90° clockwise (as viewed in FIG. 11). Thus the pawl 171 is moved to a position just beyond the second tooth 176 from the tooth which it originally engaged. Upon the second portion of the rocking movement—that is, movement of the pawl in a counter-clockwise direction (as viewed in FIG. 11)—the pawl engages the second tooth and picks up the cup 175 and moves the cup and attached shaft 72° or ⅕ of a revolution in a counterclockwise direction. Such movement causes the units wheel to be moved from the "0" to the "2" position. Upon each subsequent cycle of the receptacle, the units wheel is advanced through 72° or ⅕ of a revolution.

It will be noted that upon each movement of the pawl through 90° in a counterclockwise direction (as viewed in FIG. 11) the pawl is moved past the second tooth from the tooth with which the pawl originally engaged. Upon the return movement of the pawl it moves through 18° before engaging the second tooth. This movement permits the rockable assembly consisting of the receptacle 85, the two magnet elements 160 and 161, the driving disk 162, the pawl 171 and the spring 172 to acquire some momentum before the pawl engages a ratchet tooth to drive the cup 175.

After the units wheel has been rotated through eight of its ten positions, the next movement, that is, from the "eight" position to the "zero" position will actuate the tens transfer mechanism to move the tens wheel from "zero" position to "one" position. Further actuation of the counter will cause the units wheel to be rotated through successive revolutions and the tens wheel will be rotated one step upon each such revolution. Continued rotation of the tens wheel will cause the tens transfer mechanism to actuate the hundreds wheel and so on. The counter is not reversible or resettable and consequently when an amount has been registered equal to the total capacity of the number wheels, the next cycle of operation of the receptacle will cause the counter to be moved through a new counting operation such as that just described.

In the present embodiment of the invention, the receptacle is so designed that it will rock to dumping position when 2.31 cubic inches of liquid are introduced into that compartment which is in filling position. Thus, upon a complete cycle, a total of 4.62 cubic inches or 0.02 U.S. gallons will be measured. The measurement of this quantity of liquid will be registered on the counter by the movement of the units wheel from the "0" position to the "2" position. Thus, the counter will register an amount equal to hundredths of gallons. In order that the meter will register in gallon units with decimal fractions, the units and tens wheels may have their numerals in a different color or a different form than the numerals on the other wheels. It will be understood that where it is desired that the meter register in units other than U.S. gallons, the receptacle is made of an appropriate size so that the meter will register in the desired units.

The exact calibration of the meter may be effected by moving the counter-weight 105 inwardly or outwardly on the screw support 111 as above explained.

If the inflow of liquid into the meter casing exceeds the outflow, liquid will collect in the bottom of the casing and the liquid level will rise. In this connection, it will be understood that the pressure of the liquid entering the secondary inlet is greater than the head of the liquid collected in the meter so that the collection of liquid will not prevent the liquid from entering the casing through the secondary inlet. As the liquid level in the casing rises, either from the inflow through the inlet or the return through the secondary inlet or both, the float 66 will be buoyantly supported and will rise along with the liquid level. The upward movement of the float 66 will move the bail 65 upwardly and consequently effect a closing movement of the valve 55 to thereby shut off any inflow of liquid into the meter through the primary inlet. With the pump continuing to operate, the liquid will be withdrawn from the meter casing and supplied to the burner and so long as the burner is operating, some of the liquid will be consumed, although at least some will ordinarily be returned to the casing. The float is constructed to have such buoyancy that it will operate to close the inlet valve 55 before the level of the liquid rises to the height of the lowest portion of the receptacle. When the inlet valve 55 is closed the only liquid that can enter the casing is that which is returned through the secondary inlet. Such liquid cannot exceed in amount the amount withdrawn through the outlet of the meter. Thus, the level of the liquid cannot rise above that at which the inlet valve 55 is closed.

When the level of the liquid in the casing falls sufficiently, the float will move downwardly to a position to permit the valve 55 to be moved downwardly by gravity or by differential fluid pressure into open position and liquid can again be drawn into the casing from the source of supply.

It will be understood that the pump may not be operated continuously. In fact where the pump is supplying a fuel burner the pump will operate intermittently as is customary in such installations. When the pump is not operating, no liquid will flow in the system and the meter will not be actuated. However, since the system is already primed, the pump will, when it is reactivated, draw liquid from the meter casing and supply it to the burner. If the inlet valve 55 is closed, no liquid will be drawn into the meter casing but the pump will continue to pump liquid withdrawn from the meter casing. In this connection, it will be understood that the arrangement is such that there will ordinarily be enough liquid in the system to insure that the pump will remain primed between successive periods of operation of the pump except at a time after all of the liquid above the lower end of the inlet pipe 21 in the tank is exhausted.

If at any time the meter is moved out of plumb position more than the predetermined angle provided for in the design of the meter, the outlet valve member 120 will assume a position wherein it closes the outlet and liquid cannot be drawn out of the meter casing. Thus, no liquid will be drawn into the meter. The flow can only be re-established when the meter is returned to its plumb position or to a position within a few degrees of the plumb position as established by the design of the meter. When the meter is returned to plumb position or within the limits of the aforesaid predetermined angle, the outlet valve 120 will swing to open position and flow conditions will be automatically re-established.

The meter is made tamper-proof by the provision of the sealing wire 190 and the seal 191 above described which prevents removal of the counter or access to the counter mechanism. In this connection there is also provided a sealing wire 220 and seal 221 which wire is passed through openings in the head of one of the stay bolts 42 and the screw plug 114 in the base 36.

A second embodiment of the invention is shown in FIGS. 12 and 13, to which reference now is made. In this embodiment the structure is identical with the structure of the embodiment shown in FIGS. 1–11 inclusive, except as hereinafter expressly pointed out.

The base 300 is formed with a circular boss 301, in which is provided a bore 302 communicating with the bore 303, both bores forming a portion of the outlet passage. The top face 304 of the boss 301 is of concave spherical shape.

The outlet valve element 305 includes a body 306 of circular form, having a bottom face 307 of convex spherical form and a peripheral flange 308 surrounding the face 307. An elongate passage 309 is provided in the form of a groove in the face 307. The passage 309 extends generally outwardly in the face 307 and has an inner end adapted to register with the bore 302 when the outlet valve member 305 is in vertical position, and an outer end which extends beyond the boss 301 and communicates with the interior of the meter casing. Thus, when the valve member 305 is in vertical position, a communication is provided between the interior of the meter casing and the bore 302 to permit liquid to flow out of the casing through the outlet 303. On the other hand, when the valve member is displaced by a predetermined amount out of vertical position, the inner end of the passage 309 is opposite an imperforate portion of the surface 304, and communication is closed between the interior of the meter casing and the bore 302.

The valve includes a body 306 carried by a stem 310 which carries a float 311 movable in a bore 312 in the float 313, which latter float operates the inlet valve 315 in the manner described in connection with the embodiment shown in FIGS. 1–11. The stem 310 has a head 316 formed within its upper end with a socket 317 which receives the point 318 of a needle bearing member 319 threaded into the bracket 320 and secured in position as by a nut 321. The arrangement is such as to permit swinging movement of the valve member 305 about the pivot provided by the needle bearing member 319.

The buoyancy of the outlet valve member 305 is such that it is normally supported in the meter casing by the liquid (not shown) which collects in the bottom of the meter casing, so that there is a minimum of friction between the surface 307 and the surface 304; that is, the valve member 305 may be fully supported by reason of its buoyancy, or it may bear with some force against the upper face 304 of the boss 301. However, the valve member 305 should be sufficiently supported by its buoyancy so that the friction between the surfaces, 304 and 307 does not interfere with the operation of the device. Thus, the valve member 305 will rock about the needle bearing as the level of the liquid in the meter casing is tilted or rocked.

In operation the meter normally is mounted so that the pivot axis of the receptacle 330 is horizontal. In this position of the meter there is free communication between the interior of the casing and the bore 302, and consequently the outlet. If the meter installed in a position wherein it is out of plumb more than predetermined extent, or if, after installation, it is tilted out of plumb position more than a predetermined extent, the change in position of the level of the liquid in the casing relative to the vertical will cause the float 311 to move and thereby move the valve element 305 in the corresponding direction, and thereby move the inner end of the passage 309 out of registry with the bore 302 and close the outlet valve. Thus, no further liquid will flow from the meter casing. This will result in the collection of an additional quantity of liquid in the meter casing, which will cause the float 313 to rise and eventually close the inlet valve 315, thereby halting operation of the meter. Flow through the meter can only be re-established if the meter is returned to plumb position. As soon as this has been effected, the meter automatically is conditioned for further operation.

The length of the valve element 305 from the face 307 to the socket 317 is sufficient so that there is a slight clearance between the surfaces 307 and 304 when the valve element 305 is buoyantly supported, thus permitting free swinging movement of valve element 305. It will be seen that when the valve element 305 is in closed position and the system is operated, the suction created in the orifice 302 will cause the valve element 305 to be drawn down into firm engagement with the face 304, and thus completely seal the outlet valve so that no liquid will escape.

Instead of mounting the counter outside of the casing and driving it by means of a magnetic clutch as shown, it may be mounted inside the casing and the ratchet drive connected directly to the receptacle in a manner not shown. However, it is generally preferable to mount the counter outside the casing so that it is not exposed to the liquid passing through the meter.

While the receptacle has been shown and described as a single receptacle having two compartments, it will be understood that two separate, balanced receptacles (not shown) may be employed, such receptacles being mounted on a suitable frame or other connecting means with the assembly being supported for rockable movement to provide an action similar to that of the single, compartmented receptacle. Thus, where a "receptacle" is referred to herein, this term will be understood to mean either a single compartmented receptacle or a pair of receptacles mounted for conjoint movement.

It will be understood that while the invention has been disclosed in connection with its application to a suction system, it is not thus limited but can be employed in a pressure system wherein the flow of liquid is effected by a positive pressure.

I claim:

1. A liquid supply and metering system comprising a meter including a casing defining a chamber, liquid measuring means in said chamber, said casing having an inlet leading into said chamber on the upstream side of said measuring means, an outlet leading from said chamber on the downstream side of said measuring means, and a secondary inlet leading into said chamber on the downstream side of said measuring means, a liquid pump connected to said casing outlet and having a primary discharge outlet and a secondary discharge outlet, and conduit means connecting the secondary outlet of said pump and the secondary inlet of said casing.

2. A liquid supply and metering system as set forth in claim 1 wherein a check valve is provided in said conduit means for preventing the flow of liquid from said chamber through said secondary outlet, said conduit having a vent located therein between said secondary pump outlet and said check valve and a valve in said vent for closing said vent.

3. A liquid supply and metering system comprising a meter including a casing defining a chamber, a receptacle having two compartments, means supporting said receptacle in said chamber for pivotal movement between a first position in which a first one of said compartments is in position to receive and hold liquid therein and the other of said compartments is in liquid dumping position and a second position wherein said second compartment is in position to receive and hold liquid therein and said first compartment is in liquid dumping position, said casing having a primary inlet leading into said chamber in position to discharge liquid into that compartment which is in liquid receiving and holding position, a primary outlet leading from said chamber below the level of said receptacle, and a secondary inlet leading into said chamber in position to introduce liquid in by-passing relation to said receptacle, a liquid pump connected to said outlet and having a primary discharge outlet and a secondary outlet and conduit means connecting said secondary pump outlet and said secondary inlet.

References Cited by the Examiner

UNITED STATES PATENTS

| | | | |
|---|---|---|---|
| 224,736 | 2/1880 | Shea | 137—45 X |
| 778,887 | 1/1905 | Pearce | 177—94 |
| 957,082 | 5/1910 | Nash. | |
| 1,104,688 | 7/1914 | Mason | 177—94 X |
| 1,143,109 | 6/1915 | Downey | 177—94 |
| 1,228,467 | 6/1917 | Morris | 135—45 X |
| 1,228,656 | 6/1917 | Emerson et al. | 137—45 X |
| 1,387,701 | 8/1921 | Gardiner | 73—221 X |
| 1,546,200 | 7/1925 | Cavins | 177—94 X |
| 1,746,382 | 2/1930 | Davis. | |
| 1,887,400 | 11/1932 | Dayton | 73—254 |
| 2,433,405 | 12/1947 | Stamm | 137—45 |

RICHARD C. QUEISSER, *Primary Examiner.*